United States Patent [19]
Okada et al.

[11] Patent Number: 5,869,824
[45] Date of Patent: Feb. 9, 1999

[54] DATA OUTPUT CONTROLLER

[75] Inventors: Narihiko Okada, Sagamihara; Yoshio Kurishita, Yokohama; Tetsuo Kanno, Fujisawa; Atsushi Odate, Atami; Yuichi Sato, Yokohama, all of Japan

[73] Assignees: IBM Japan, Ltd., Minato-Ku; Advanced Peripheral Technologies, Inc., Kanagawa-Ken, both of Japan

[21] Appl. No.: 804,641

[22] Filed: Feb. 25, 1997

[30] Foreign Application Priority Data

Jul. 2, 1996 [JP] Japan ................................. 8-172248

[51] Int. Cl.6 ........................................................ G06K 5/00
[52] U.S. Cl. ........................................... 235/380; 235/382
[58] Field of Search ..................................... 235/380, 375, 235/382, 392; 364/200, 228; 395/425, 400

[56] References Cited

U.S. PATENT DOCUMENTS

| 4,751,669 | 6/1988 | Sturgis et al. | 364/900 |
| 4,868,738 | 9/1989 | Kish et al. | 364/200 |
| 5,226,145 | 7/1993 | Moronaga et al. | 395/425 |

FOREIGN PATENT DOCUMENTS 64238   1/1994   Japan .

*Primary Examiner*—Thien Minh Le
*Attorney, Agent, or Firm*—Volpe and Koenig, P.C.

[57] ABSTRACT

The output data controller is provided with a data printing area for storing print data. Management data is generated by the attribute data of a banner page and is stored in a management table. Based on the management data stored in the management table, the print data stored in the data printing area is managed.

2 Claims, 6 Drawing Sheets

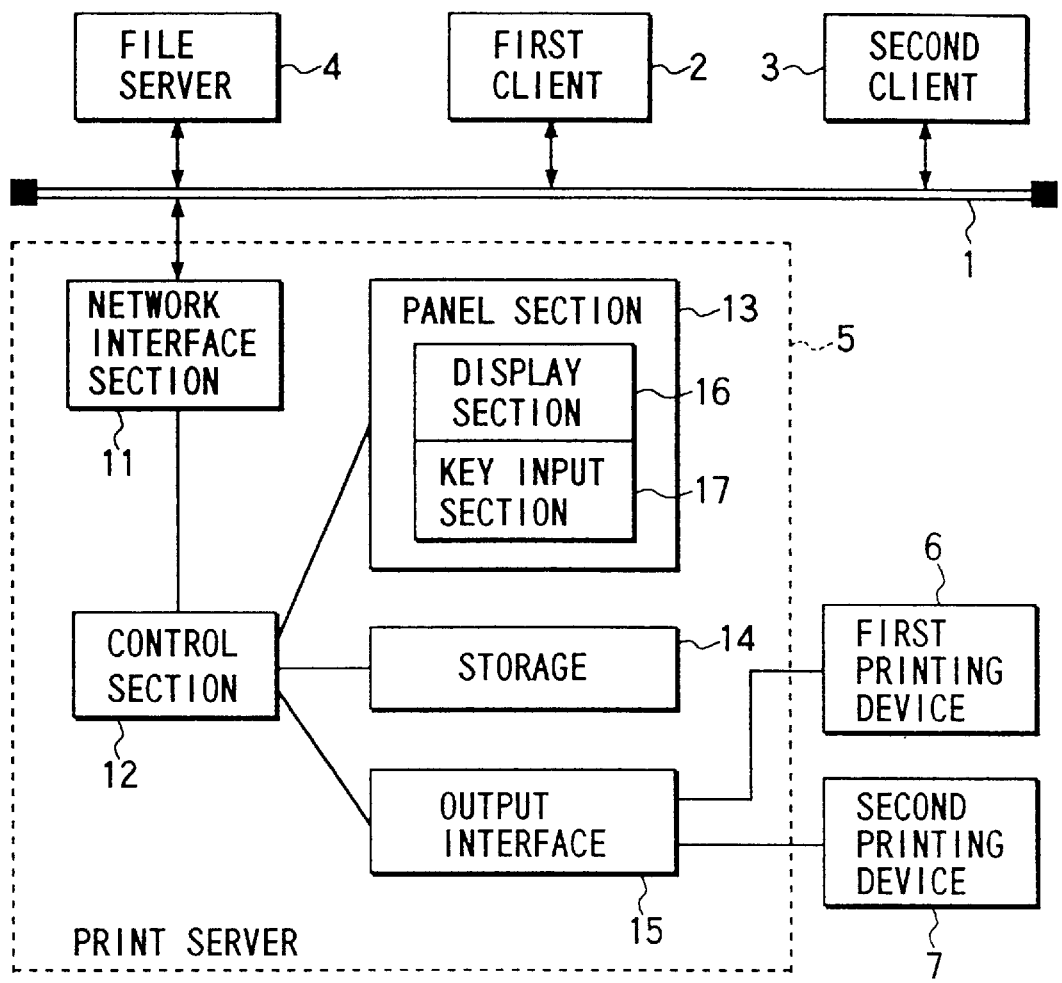
F I G. 1
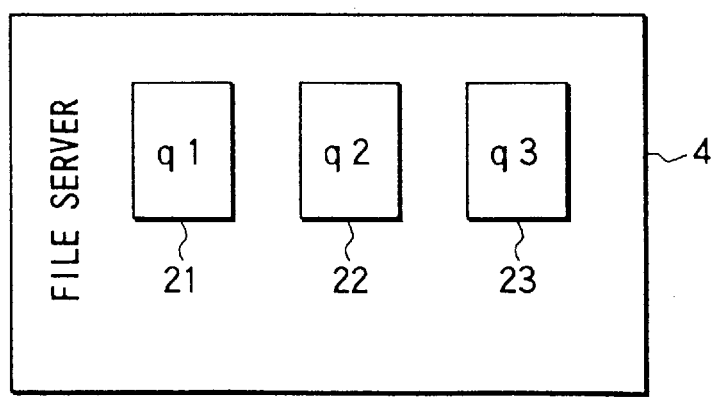
F I G. 2

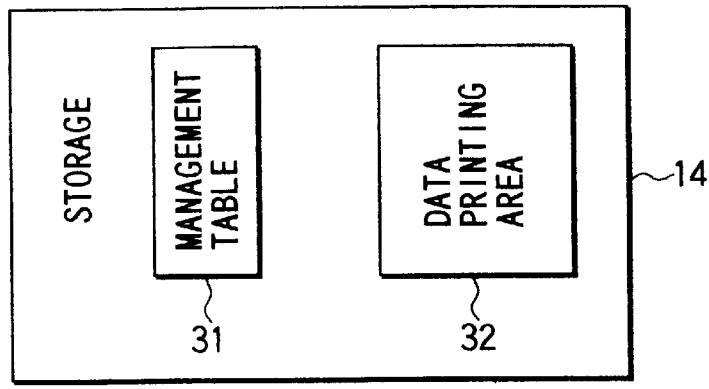
F I G. 3
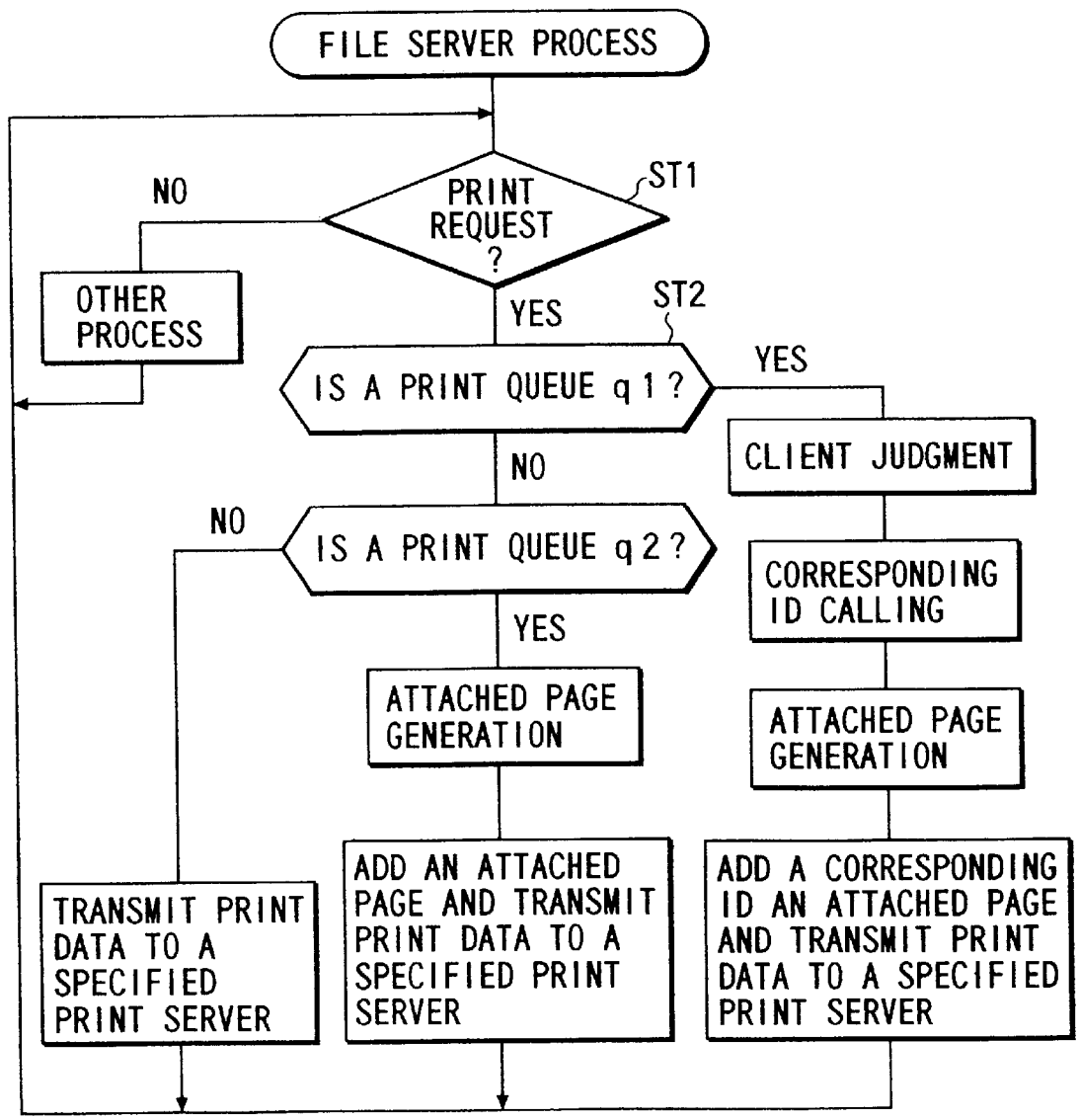
F I G. 4

```
****************************
*                           *
*                           *
*  Print Server             *
*                           *
*  User Name     : ○○○○      *
*  File Name     : ○○○○      *
*  Directory     : ○○○       *
*  Queue         : BONI      *
*  File Server   : ATS_01    *
*  Print Server  : AP000266  *
*  Description   : Microsoft word  Document 1 *
*  Date/Time     : 96-06-04 / 19 : 44 : 44 *
*                           *
*                     1pt : *
****************************
```

FIG. 8

DATA OUTPUT CONTROLLER

BACKGROUND OF THE INVENTION

The present invention relates to an output data controller that receives data through a line and outputs the received data to an external output device.

In data output systems where a plurality of personal computers interconnected through a network print out data by a printing device, a data output controller called a print server is interposed between a file server which temporarily archives data connected onto a personal computer or a network and the printing device. It is possible to connect a plurality of printing devices to this print server.

It is possible in a system such as this to print out desirable print information from any personal computer to any printing device connected to the print server. In that case the print data is temporarily stored in the file server and then is transmitted from this file server through the print server to a specified printing device, by means of which the data is printed out.

In a communication operating system (OS) where data transmission and reception are controlled in a network by using a file server and a print server, for example, in NetWare (US Novel Co.), a header file called a banner page is added before data that is transmitted or received. This banner page, as shown in FIG. 8, is constituted by a user name (of print data), a file name, a directory name, a queue name, a file server name, a print server name, a generation tool name, or creation data and time, etc., as attribute data. This banner page is used in the identification in the data transmission and reception control and also is printed out as indicating the head of each print data when printed by a printer.

The banner page and the data (print data) will be deleted from the buffer of the print server and will no longer exist in the network system, if printing is ended.

In the conventional data output controller, when printing errors occur in the printing device, there is the problem that the transmitted data must be again transmitted, because the data has already been deleted from the network.

As a method of solving this problem, there is not a buffer which temporarily stores data in the data output controller but a memory for storing data. However, in that case a method of managing stored data is needed.

BRIEF SUMMARY OF THE INVENTION

Accordingly, it is the objective of the present invention to provide a data output controller which is capable of efficiently managing and storing data.

The invention corresponding to claim 1 is constituted by a data output controller, which receives data through a line and outputs this received data to an external output device. The data output controller comprises a storage for storing the received data and a management data storage controller for taking out attribute data of output data from a header file added to the received data by a communication operating system to form management data and storing the management data in the storage. The output data stored in the storage is managed based on the management data stored in the storage.

In accordance with the present invention, as described above, there can be provided a data output controller which is capable of efficiently managing and storing data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the structure of a network system using a print server of an embodiment of the present invention;

FIG. 2 is a block diagram showing the essential structure of the file server of the network system using the print server of the embodiment;

FIG. 3 is a block diagram showing the essential structure of the print server of the embodiment;

FIG. 4 is a diagram showing the flow of a file server process that is performed by the file server of the network system using the print server of the embodiment;

FIG. 8 is a diagram showing an example of the banner page in a communication operating system.

DETAILED DESCRIPTION OF THE INVENTION

Figure 5:
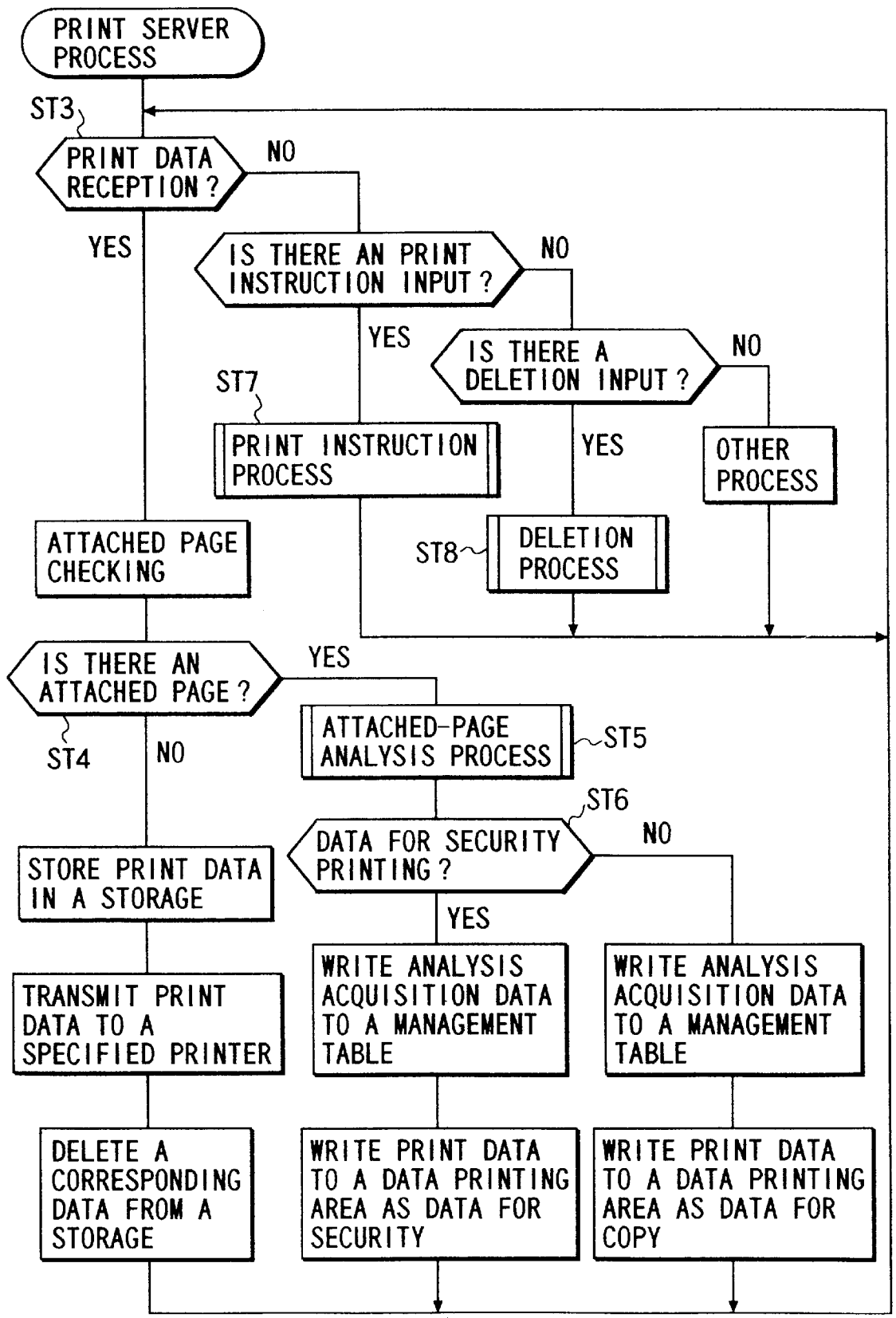
FIG. 5 is a diagram showing the flow of a print server process that is performed by the print server of the embodiment.

An embodiment of the present invention will hereinafter be described in reference to the drawings.

FIG. 1 is a block diagram showing the rough structure of a network system using a print server as a data output controller to which the present invention is applied.

Reference numeral 1 is a local area network (LAN) as a line. A plurality of clients (work stations or personal computers as user terminals), such as first client 2 and second client 3, are connected to this LAN 1.

Also, a file server 4 and a print server 5, which serve as network stations which perform control of the network and management of files and printing, are connected to the aforementioned LAN 1.

A first printing device 6 and a second printing device 7 are connected to this print server 5.

The aforementioned print server 5 is constituted by a network interface 11, a control section 12, a panel section 13, a storage 14 (a nonvolatile memory, such as a hard-disk unit), an output interface 15, and so on.

The aforementioned network interface 11 is connected to the aforementioned LAN 1, communicates with another network terminal through a network (this LAN 1), and has a function of receiving the print data of a request to print and transmitting it to the aforementioned control section 12. In addition, when printing is performed from the LAN 1, at intervals of a single print request task (print data) unit the network interface 11 issues a task start command before transmission of the print data to the aforementioned control section 12 and also issues a task end command after transmission of the print data to the aforementioned control section 12.

The aforementioned control section 12 is constituted by a central processing unit (CPU), a read-only memory (ROM), a random access memory (RAM), etc., although not shown. The control section 12 is connected to the aforementioned network interface 11 and also is connected to the aforementioned panel section 13, the aforementioned storage 14, and the aforementioned output interface 15. This control section 12 receives print data from the aforementioned network interface 11 and stores it in the storage 14 as a single file at intervals of a single print task unit by the task start command and the task end command. From the header file (banner page or separator page) of this print data, the requester of a request to print the data and the file name of the print data are identified.

Also, as described later, from the existence of the attached data that has been added to the header file, it is judged whether or not the print data should be stored. When the storage is necessary, the print data is stored in the aforementioned storage 14, and the print data stored in this storage 14 is controlled.

The aforementioned panel section 13 is equipped with a display section 16 consisting of a LCD and a key input section 17 constituted by various kinds of keys. The data and the internal management information, stored in the aforementioned storage 14, are displayed on the aforementioned display section 16, and a key operation which operates equipment is performed in the key input section 17. The aforementioned control section 12 causes the display section 16 of the panel section 13 to display the management operation and management information of the aforementioned storage 14 and also judges the input from the key input section 17 to perform control.

The aforementioned output interface 15 performs data transmission control for outputting the print data, selected from the aforementioned control section 12 and called out from the aforementioned storage 14, to the first printing device 6.

The aforementioned file server 4, as is shown in FIG. 2, is provided with a first queue (q1) 21 where print data for security is stored, a second queue (q2) 22 where print data for copy is stored, and a third queue (q3) 23 where there is stored print data which is printed out by an ordinary request to print. In the first queue 21 and the second queue 22 there is set a network operating system (NetWare) so that a banner page is previously added. For the third queue 23, it is set, based on other conditions, whether or not a banner page is added.

Note that the set data of a corresponding identification number (ID) of a user has been stored for each client in the aforementioned file server 4 and that the set data of an ID and a corresponding password have been stored for each user in the aforementioned print server 5.

FIG. 3 is a diagram showing the flow of a file server process which is performed by the aforementioned file server 4.

First, it is judged in step 1 (ST1) whether or not a request is a print request from a client. If it is judged that the request is not a print request, other processing will then be performed. If this other processing is ended, the processing will then be returned to the aforementioned step 1 again.

Also, if it is judged that the request is a print request, in step 2 (ST2) it will be judged whether or not the request is a print request with respect to the first queue (q1) 21 as a print queue.

Here, if it is judged that the request is a print request with respect to the first queue 21 as a print queue, it will be judged which client transmitted the print request, and the corresponding ID will be called out.

There is generated attached data which includes the called-out ID and which consists of data (queue q1) indicating that data is print data from the first queue 21. This attached data is added to a banner page which consists of the user name and file name of the head of print data (in the case of a network operating system, NetWare), and this print data is transmitted to the print server 5. If the transmission of the print data to this print server 5 is ended, the processing will then be returned to the aforementioned step 1 again.

Also, if it is judged that the request is not a print request with respect to the first queue 21 as a print queue, it will be judged whether or not the request is a print request with respect to the second queue (q2) 22 as a print queue. Here, if it is judged that the request is a print request with respect to the second queue 22, there will be generated attached data which includes data indicating that data is print data for copy and which consists of data (queue q2) indicating that data is print data from the second queue 22. This attached data is added to a banner page which is added to the head of print data, and this print data is transmitted to the print server 5. If the transmission to this print server 5 is ended, the processing will then be returned to the aforementioned step 1 again.

Also, if it is judged that the request is not a print request with respect to the second queue 22 as a print queue, it will be judged that the request is a print request with respect to the third queue 23, and the print data will be transmitted to the print server 5 without adding the banner page. If the transmission to this print server 5 is ended, the processing will then be returned to the aforementioned step 1 again. Note that an ordinary banner page may also be added to the third queue 23.

FIG. 5 is a diagram showing the flow of a print server process which is performed by the aforementioned file server 5.

Initially, it is judged in step 3 (ST3) whether or not print data was received.

Here, if it is judged that the print data was received, the attached page (banner page) of the head of the print data will be checked and it will be judged in step 4 (ST4) whether or not the banner page has been added.

Here, if it is judged that the banner page has not been added, the print data will be stored in the storage 14, and at the same time, the stored print data will be transmitted to a specific printing device. If the transmission of this print data to the printing device is ended, the print data currently stored in the storage 14 will then be deleted and the processing will be returned to the aforementioned step 3 again.

Also, if it is judged in the aforementioned step 4 that the banner page has been added, in step S5 (ST5) there will be performed an attached-page analysis process which analyzes the ID data of a print requester (user) and the attribute data, such as a print file name and a print queue name. If this attached-page analysis process is ended, in step 6 (ST6) it will then be judged whether the received print data is data for security printing or data for copy printing, based on the printed queue name analyzed by the attached-page analysis process in the aforementioned step 5 and on whether the printed queue name is the first queue (q1) 21 or the second queue (q2) 22.

Here, if the first queue 21 has been registered and if it is judged that the print data is data for security printing, the analysis acquisition data (attribute data) obtained in the attached-page analysis process of the aforementioned step 5 will be written to management table 31 as management data. The print data will be written to data printing area 32 as data for security, and the processing will be returned to the aforementioned step 3. Note that in the case where the ID data of a user has not been registered when it is judged that the print data is data for security printing, the processing can be handled as ordinary print processing.

Also, if the first queue 21 has not been registered but the second queue 22 has been registered and if the print data is judged to be data for copy printing, the analysis acquisition data (attribute data) obtained in the attached-page analysis process of the aforementioned step 5 will be written to the management table 31 as management data. The print data will be written to the data printing area 32 as data for copy, and the processing will be returned to the aforementioned step 3.

In addition, if in the process of step 3 it is judged that the print data has not been received, it will be judged whether or not there is a print instruction input from the key input section 17 of the panel section 13. Here, if it is judged that the print instruction input is present, a print instruction process will be performed in step 7 (ST7), as described later. If this print instruction process is ended, the processing will then be returned to the processing of the aforementioned step 3 again.

If it is judged that the print instruction input is not present, it will then be judged whether or not there is present a deletion instruction input through the key input section 17.

Here, if it is judged that the deletion instruction input is present, a deletion process will be performed in step 8 (ST8), as described later. If this print instruction process is ended, the processing will then be returned to the processing of the aforementioned step 3 again.

In addition, if it is judged that there is no deletion instruction input, other processing will be performed. If this other processing is ended, the processing will then be returned to the processing of the aforementioned step 3 again.

Figure 6:
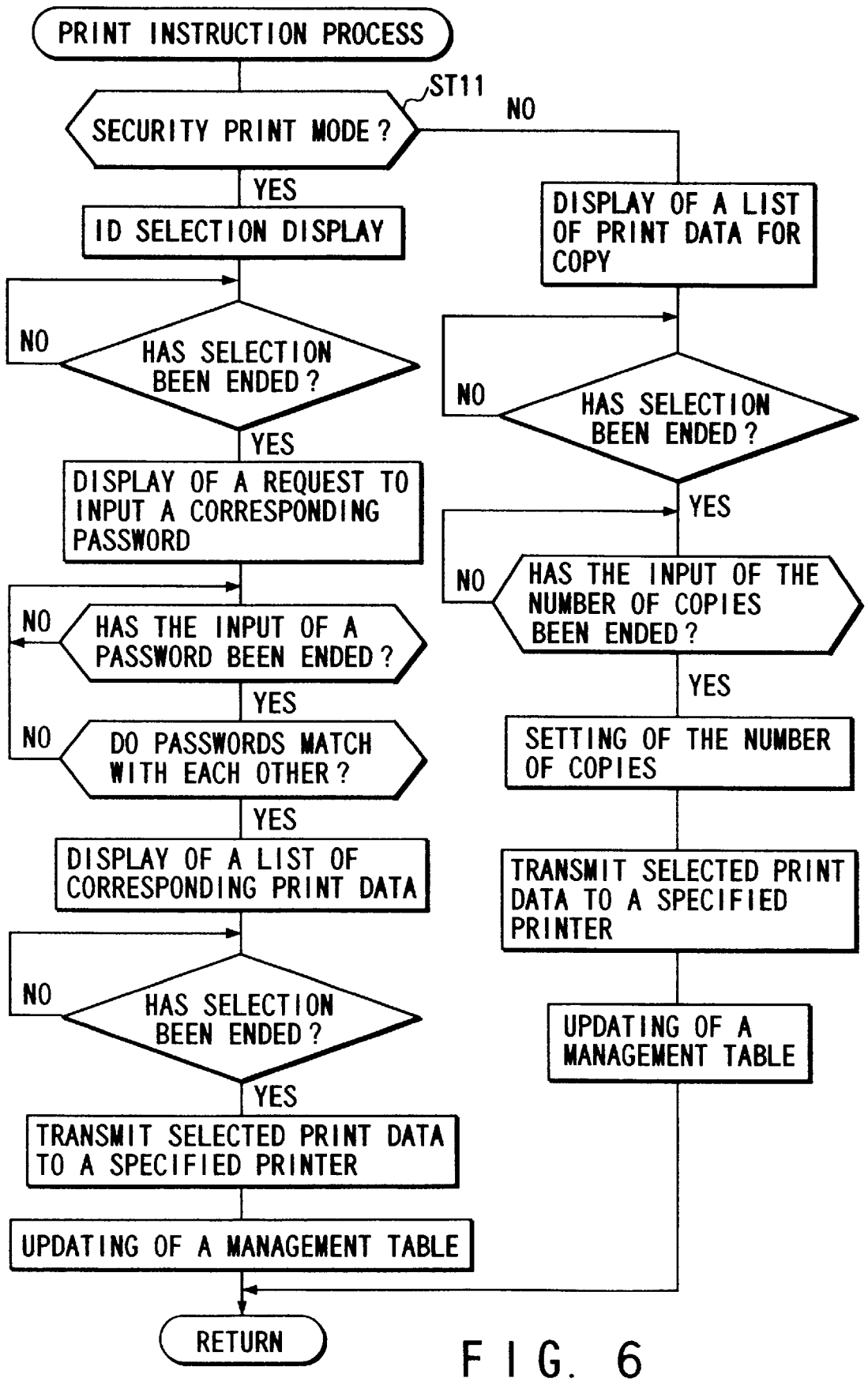
FIG. 6 is a diagram showing the flow of a print instruction process that is performed in the print server process by the print server of the embodiment.

FIG. 6 is a diagram showing the flow of the print instruction process that is performed in the aforementioned step 7 by the printer server 5.

Initially, in step 11 (ST11) it is judged, base on the input from the key input section 17, whether the input is a security print mode or a copy print mode.

Here, if it is judged that the input is a security print mode, a display for selecting user IDs (an ID listing display) will be performed on the display section 16 and the processing will be in a stand-by state until the ID selection by the key input section 17 based on this display is ended.

If the ID selection is ended, a display to request the input of a password corresponding to this display will then be performed on the display section 16 and the processing will be in a stand-by state until the input of the password from the key input section 17 with respect to the display is ended.

If the input of the password is ended, it will then be judged whether or not the input password matches with the password set in the storage 14 in correspondence with the aforementioned selected ID.

Here, if it is judged that the passwords do not match with each other, again the processing will be returned to the aforementioned stand-by state until the input of the password is ended.

If, on the other hand, it is judged that the passwords match with each other, a list of the file names of the print data to which the ID data has been added will then be displayed on the display section 16, based on the management data stored in the management table 31, and the processing will be in a stand-by state until the selection of the password by the key input section 17 is ended.

If the selection of the print data is ended, this selected print data will then be called out from the data printing area 32 and transmitted to a specified printing device. If this transmission of the print data to the printing device is ended, the corresponding management data of the management table 31 will then be updated and this print instruction processing will be ended.

Also, if in the aforementioned step 11 it is judged, based on the input from the key input section 17, that the input is not a security print mode but a copy print mode, a list of the print data for copy added to the banner page will be displayed on the display section 16, based on the management data stored in the management table 31 among the print data stored in the storage 14, and the processing will be in a stand-by state until the selection of the print data by the key input section 17 is ended.

If the selection of the print data is ended, the processing will then be in a stand-by state until the input of the number of copies by the key input section 17 is ended.

If the input of the number of copies is ended, the number of copies will then be set and the selected print data will be transmitted to a specified printing device. If this transmission of the print data to the printing device is ended, the corresponding management data of the management table 31 will then be updated and this print instruction process will be ended.

Note that the printing device is constructed so that, in the case where the number of copies has been set, the transmitted print data is printed out by the number of copies.

If this print instruction process is ended, this processing will then be returned to the aforementioned printer server processing again.

Figure 7:
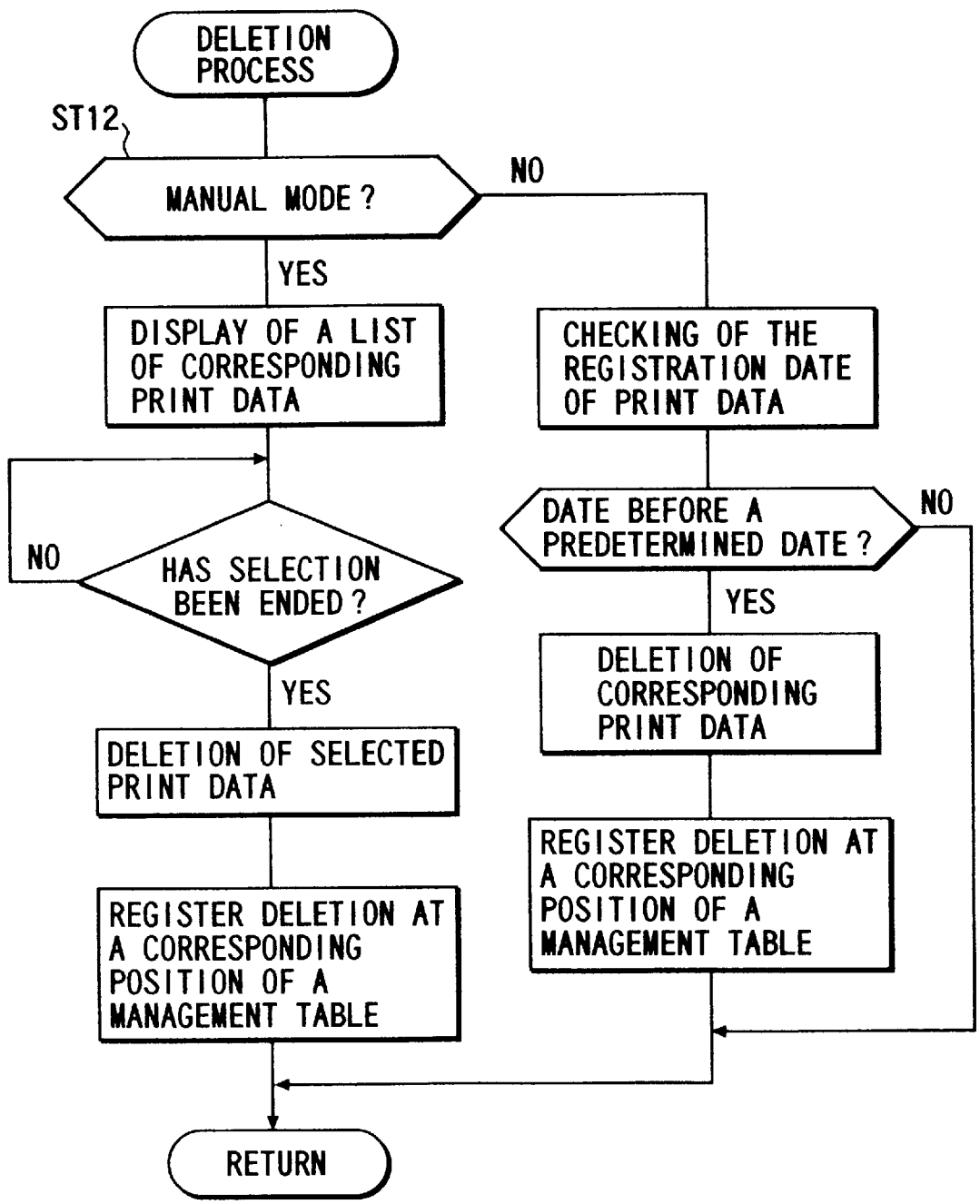
FIG. 7 is a diagram showing the flow of a deletion process that is performed in the print server process by the print server of the embodiment.

FIG. 7 is a diagram showing the flow of a deletion process that is performed in the aforementioned step 5 by the print server 6.

First, in step 12 (ST12) it is judged whether or not the set mode of this print server is a manual mode in which print data can be arbitrarily deleted by an operator.

Here, if it is judged that the set mode is a manual mode, an ID will be input from the key input section 17, and based on the management data stored in the management table 31, a list of all print data will be displayed on the display section 16, exclusive of the print data for security registered in terms of that ID, or, an ID and the corresponding password will be input from the key input section 17 and, based on the management data stored in the management table 31, a list of all print data will be displayed on the display section 16, exclusive of the print data for security registered in terms of that ID. This processing will be in a stand-by state until the selection of the print data by the key input section 17 is ended.

If the selection of the print data is ended, confirmation will be again input from the key input section 17 and then the selected print data will be deleted from the data printing area 32. Data representative of deletion is registered at the corresponding position of the management table 31 and then this deletion process will be ended.

Also, if in step 12 it is judged that the set mode is not a manual mode, the registration date of the print data will be checked based on the management data stored in the management table 31 and it will be judged whether or not the checked registration dates include the date before a predetermined date from the present date.

Here, if it is judged that all registration dates are not the date before a predetermined date from the present date, this deletion process, as it is, will be ended without deleting the print data.

Also, if it is judged that among registration dates there is the date before a predetermined date from the present date, the print data of the corresponding registration date will be deleted from the storage 14, based on the management data stored in the management table 31. Data representative of deletion will be registered at the corresponding position of the management table 31, and this deletion process will be ended.

If this deletion process is ended, the processing will then be returned to the printer server process again.

In the embodiment constructed as described above, if it is assumed that a manager on the LAN 1 operates the first client 2 as a dedicated device, a password corresponding to an ID will be set for each user to this first client 2, and the set information of the ID and the password set for each user will be transmitted to the print server 5 through the LAN 1.

If the print server 5 receives the set information of the ID and the password for each user, the set information will be stored in the storage 14 and will be used when the control section 12 manages the print data.

A description will be made of the case where the data, generated by any of the clients 2, 3, . . . , is printed.

In the case where an ordinary print mode is selected (i.e., case where the secrecy of generated data is low and there is no obstacle even when others viewed the data), the print requester of the client specifies the third queue (q3) 23 of the file server 4 and transmits a print request from the client, together with data (print data).

The transmitted print data is stored temporarily in the third queue 23 of the file server 4. At this time, the file server 4 can confirm which user (client) issued the request to print, for this print data. The print data is transmitted from the third queue 23 of this file server 4 to the print server 5.

If the print server 5 receives the print data, it will then be judged whether or not an attached page (banner page) has been added to this print data. Here, the print data has been transmitted from the third queue 23, so a banner page is not added.

Therefore, it is judged that the banner page has not been added, the control section 12 of the print server 5 stores the print data in the storage 14 and at the same time transmits the stored print data to a specified printing device. In the specified printing device the print data is printed out on paper.

When the security print mode is selected, the print requester of a client specifies the first queue (q1) of the file server 4 and transmits the print data from the client, together with the request to print.

The transmitted print data is stored temporarily in the first queue 21 of the file server 4. At this time, the file server 4 adds the banner page, to which the ID data of a user corresponding to a client was added, to the print data and transmits it from the first queue 21 to the print server 5.

If the print server 5 receives the print data to which the banner page with the ID data of a user was added, it will then be judged that the ID data, which indicates that the print data is print data for security, has been added. Therefore, the control section 12 analyzes the attribute data of the banner page to generate management data. The management data is registered in the management table 31, and the print data is stored in the data printing area 32 as print data for security. However, in this stage the transmission to the printing device is not performed.

That is, if a print requester (user) indicates and inputs security printing with the key input section 17 of the print server 5, a display for selecting IDs will be performed on the display section 16. If an ID is selected, a display for requesting the input of a password will then be performed on the display section 15. If an input password matches with the password set in the interior of the print server 5 in correspondence with that ID, the print server 5 will then display on the display section 16 a list of file names of the print data stored in the data printing area 32 as print data for security in correspondence with that ID.

If a print requester selects print data, which is printed out, from this list with the key input section 17, the selected print data will then be called out from the storage 14 and transmitted to a specified printing device. At this time, the management data of the management table 31 is updated. The specified printing device will print out the print data on paper.

When a user selects the copy print mode, the print requester of a client specifies the second queue (q2) of the file server 4 and transmits a print request from the client, together with the print data.

The transmitted print data is stored temporarily in the second queue 22 of the file server 4. At this time, the file server 4 adds the banner page, where the print data for copy was added to the client, to the print data and transmits it from the second queue 22 to the print server 5.

If the print server 5 receives the print data where the banner page with the print data for copy was added, it will then be judged that the print data for copy, which indicates that the print data is print data for copy, has been added. Therefore, the control section 12 stores the print data in the storage 14 as print data for copy. However, in this stage the transmission to the printing device is not performed.

That is, if the print requester indicates and inputs copy printing with the key input section 17 of the print server 5, a list of file names of the print data, stored in the data printing area 32 as print data for copy printing, will be displayed on the display section 16, based on the management data of the management table 31.

If the print requester selects print data, which is printed out, from this list with the key input section 17 and if the number of copies is set, the selected print data will then be called out from the storage 14 and transmitted to a specified printing device. At this time, the corresponding management data of the management table 31 is updated. The specified printing device will print out the print data on the set number of sheets of paper.

Also, the print data, stored in the data printing area 32 for each management data (each item) of the management table 31, can be retrieved by the input from the key input section 17. By this retrieval, the print data selected can be transmitted to a printing device and printed out.

For example, when it is desired that the print data, which has ever been printed on a previous specific date, is again printed, the specific date of the data related to the printing history of the management data is retrieved and target print data is selected. In this way, the target print data can be printed out with a printing device.

By making an inquiry with respect to the print server 5 through a network (LAN 1) from a client (personal computer), the control section 12 of the print server 5 can send back the management data of the management table 31 to the client through the network interface section 11. Therefore, the client can retrieve and manage the print data stored in the storage 14 of the print server 5.

In addition, the remote control of the reprinting or deletion of print data can be performed based on the management data of the management table 31.

Furthermore, the client can acquire the print data stored in the storage 14 from the print server 5. That is, it has become possible to use the print server as a file server.

Thus, in accordance with this embodiment, the management data related to print data is registered in the management table 31, based on the attribute data which constitutes a banner page, and print data is stored in the data printing area 32. Therefore, even if printing errors occurred in the printing device, the time required for again sending print data from a client could be saved because the print data can be stored. Furthermore, by employing the attribute data of a banner page, the management data can be efficiently generated and the print data can be managed.

In addition, this embodiment can have the advantage that the secrecy of the print data can be protected, by adding the ID data of a print requester to a banner page and identifying the ID in the print server 5.

While this embodiment has been described with reference to the case where the banner page of a network operating system (communication operating system), NetWare (US Novel Co.), is used, this invention is not limited to this. For example, the invention is also applicable to another network operating system, such as the separator page of Windows NT (US Microsoft Corporation).

In accordance with the present invention, as described above, there can be provided a data output controller which is capable of efficiently managing and storing data.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

We claim:

1. A data output controller for receiving data through a line and outputting this received data to an external output device, comprising:

a storage for storing said received data;

a management data storage controller for taking out attribute data of output data from a header file added to said received data by a communication operating system to form management data and storing said management data in said storage; and a management data transmitter for transmitting said management data stored in said storage to said external device in response to an inquiry from said external device connected to said line;

whereby the output data stored in said storage is managed based on said management data stored in said storage.

2. The data output controller as set forth in claim 1, wherein collation data is included in said attribute data of the header file and which further comprises:

an output-requester's data input unit for inputting data of an output requester; and a collation unit for collating whether or not the data of the output requester input by said output-requester's data input unit matches with the collation data of said header file that has been added to the received data stored in said storage; and when the matching is collated by said collation unit, the output data relating to said collation data stored in said storage being managed based on the management data relating to said collation data stored in said storage.

\* \* \* \* \*

UNITED STATES PATENT AND TRADEMARK OFFICE
CERTIFICATE OF CORRECTION

PATENT NO : 5,869,824
DATED : February 9, 1999
INVENTOR(S): Okada et al.

It is certified that error appears in the above-identified patent and that said Letters Patent are hereby corrected as shown below:

Title page, item under "Assignees" please delete "Advanced Peripheral Technologies, Inc." and insert therefor--Advanced Peripherals Technologies, Inc.--

Signed and Sealed this

Twelfth Day of September, 2000

*Attest:*

Q. TODD DICKINSON

*Attesting Officer*   *Director of Patents and Trademarks*